United States Patent [19]

Andrews et al.

[11] 4,071,403
[45] Jan. 31, 1978

[54] METHOD AND APPARATUS FOR PROTECTING THE CORE OF A NUCLEAR REACTOR

[75] Inventors: Harry N. Andrews, Export; Walter G. Roman, Pittsburgh, both of Pa.

[73] Assignee: Westinghouse Electric Corporation, Pittsburgh, Pa.

[21] Appl. No.: 493,995

[22] Filed: Aug. 1, 1974

[51] Int. Cl.² ............................................. G21C 9/00
[52] U.S. Cl. ...................................... 176/50; 176/38; 176/61
[58] Field of Search ...................... 176/50, 61, 54, 38, 176/37; 73/213

[56] References Cited

U.S. PATENT DOCUMENTS

| 3,200,045 | 8/1965 | Vendryes et al. | 176/61 |
| 3,258,405 | 6/1966 | Silvers | 176/61 |
| 3,274,065 | 9/1966 | Kierulf et al. | 176/61 |
| 3,287,228 | 11/1966 | Gorker | 176/54 |
| 3,713,969 | 1/1973 | Cahill, Jr. | 176/38 |
| 3,864,209 | 2/1975 | Tong | 176/50 |

FOREIGN PATENT DOCUMENTS

| 1,815,047 | 6/1970 | Germany | 176/61 |
| 1,253,830 | 11/1967 | Germany | 176/61 |
| 946,885 | 1/1964 | United Kingdom | 176/61 |

*Primary Examiner*—Harvey E. Behrend
*Attorney, Agent, or Firm*—J. R. Campbell; Z. L. Dermer

[57] ABSTRACT

A method and apparatus for protecting fuel rods in a nuclear reactor core under conditions of a major break in the coolant inlet piping connected to the reactor inlet nozzle. A multi-venturi protector which includes multiple parallel dislosed venturies is mounted in the inlet nozzle. The characteristics of the venturi protector are such that coolant flow through the protector into the reactor is unimpeded, but reverse flow through the protector is restricted when a break occurs in the inlet piping. The resistance offered to such reverse flow permits reactor coolant and emergency core coolant to remain in contact with the reactor core for a time sufficient to allow the fuel rods to decrease in temperature to a low safe level.

1 Claim, 9 Drawing Figures

METHOD AND APPARATUS FOR PROTECTING THE CORE OF A NUCLEAR REACTOR

BACKGROUND OF THE INVENTION

The invention described herein relates to nuclear reactors and more particularly a method and apparatus for protecting the core of a reactor under conditions of a break in the inlet piping which causes loss of coolant flow through the reactor core.

During the course of operation of a nuclear reactor, coolant, usually water, is pumped through the reactor to a steam generator in a closed primary loop. As the pumped coolant flows upwardly through the reactor core, it absorbs heat from fuel rods and the thusly heated coolant is then circulated to the steam generator which transfers the heat to a secondary circuit used for driving a turbine-generator. In commercial size reactors, the coolant is circulated at a pressure of about 2250 psia and its temperature at the reactor outlet is about 610° F. Should the loop piping leading to the reactor inlet nozzle suffer a sufficiently large rupture or break, all coolant normally flowing toward the reactor will be diverted out of the pipe break and thus never reach the reactor inlet. Concurrently, the prevailing pressure in the reactor causes coolant therein to flow in a reverse direction through the inlet nozzle thereby evacuating the reactor of coolant because there is no impediment to flow between the reactor and the break in the inlet piping. It is known that under these circumstances, the reactor will purge itself of substantially all coolant within a short time period, and lack of coolant in the core then causes the fuel rods to reach high temperature levels. This temperature rise occurs even though the reactor control rods are immediately lowered to a fully inserted position in the core. Such temperature rise therefore is attributable both to a slight continuation of the fission process and to residual heat stored in fuel rods containing the fuel during normal reactor operation.

To safeguard the reactor against these undesirable conditions, the Atomic Energy Commission Reactor Design Criteria requires that manufacturers provide a source of emergency coolant, usually borated water, which promptly can be injected into the reactor core when the reactor pressure drops below a predetermined minimum. Various methods and emergency core cooling designs have been developed to assure delivery of such borated water to the reactor. However, even through such emergency systems are available, in the circumstances of a major pipe break, after the emergency coolant is injected into the reactor core, it immediately will follow the path of the main coolant stream and flow reversely through the inlet nozzle toward the pipe break because there are no restrictions or other devices present to preclude such outward flow. Further, because the fuel rod surfaces increase in temperature at an extremely high rate in the absence of coolant, and since the reaction times for achieving injecton of borated water into the reactor core is relatively long, the emergency core cooling systems thus devised are of complex design, are shrouded in high technology and involve high manufacturing and installation costs.

The major problem therefore which has always confronted reactor designers in providing safeguards against loss of coolant accidents, is how to retain a sufficient volume of primary and emergency coolant in the core and for a time period sufficient to achieve cool-down of the core fuel rods and reactor internal structural members to safe temperature levels.

SUMMARY OF THE INVENTION

Briefly state, we protect the fuel rods in a nuclear reactor core during the time of a loss of coolant accident by mounting a flow restriction type of passive device in each primary loop inlet nozzle connected to the reactor. The device permits essentially unimpeded flow of coolant into the reactor during normal reactor operations but presents a substantial impediment to flow in a reverse direction through the inlet nozzle when a break occurs in the inlet piping leading to the reactor inlet nozzle.

An object of the invention therefore is to provide a method which upon the occasion of a break in reactor inlet piping, will retain reactor coolant and emergency coolant in the core for a time period sufficient to permit proper cool-down of the core and the internal structural components.

Another object of the invention is to provide a passive protector mounted in a reactor coolant inlet nozzle which under conditions of a break in the inlet piping, will limit the reverse flow of coolant in the reactor core, thus preventing departure from nucleate boiling (DNB) and subsequent high temperatures.

Still another object of the invention is to provide a protector mounted in a reactor inlet nozzle which will retain sufficient coolant in the reactor by limiting reverse flow through the inlet nozzle, under conditions of a break in the inlet piping, to preclude unacceptable rises in temperature in the fuel rods comprising the reactor core.

BRIEF DESCRIPTION OF THE DRAWINGS

The subject matter of the invention is particularly pointed out and distinctly claimed at the end of this specification. Our invention however both as to organization and method of operation together with further objects and advantages thereof, may best be understood by reference to the following description taken in connection with the accompanying drawings in which:

DESCRIPTION OF THE PREFERRED EMBODIMENT

Figure 1:
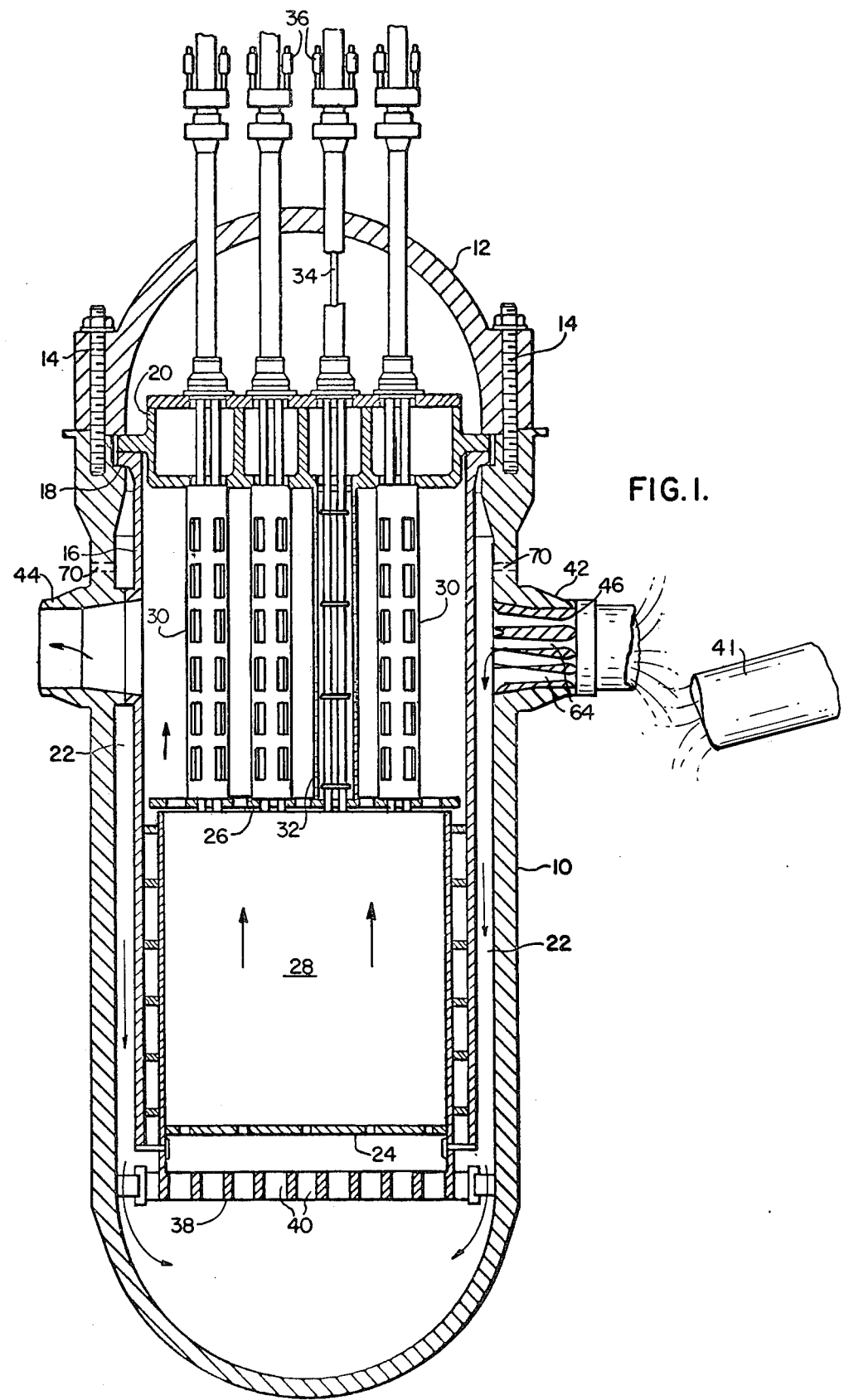
FIG. 1 is a view in elevation, partly in section, of a nuclear reactor which illustrates a multiple venturi protector located in the cold leg inlet to the reactor.

Referring now to the drawings wherein like reference characters designate like or corresponding parts throughout the several views, there is shown in FIG. 1 a general outline of a nuclear reactor including a pressure vessel 10 having a head 12 secured in fluid tight relationship therewith by bolts 14. A core barrel 16 suspended from a ledge 18 and held in place by an upper structure 20, is spaced from the pressure vessel walls to provide a downcomer 22 of annular configuration extending substantially the full length of the pressure vessel. A lower core plate 24 and an upper core plate 26 are supported by the core barrel and the area 28 defined by the core plates and barrel is designed to contain fuel assemblies, not shown, which comprise the core of the reactor after it is placed in operation. Although the number of fuel assemblies and fuel rods per assembly vary from reactor to reactor, one well known design of reactor contains 193 fuel assemblies with each assembly containing 204 fuel rods.

The space between the upper structure 20 and the upper core plate 26 contains support adapters 30, and control rod guide tubes 32 house control rods 34 which are reciprocally driven in the fuel assemblies by control rod drive mechanisms 36. The bottom of the reactor includes a lower support plate 38 having openings 40 therein. Coolant is introduced into the reactor through inlet piping 41 connected to one or more inlet nozzles 42 and flows downwardly through the annular space 22 into the bottom of the pressure vessel 10. Its flow direction is then reversed and the coolant flows upwardly through openings 40, lower core plate 24 and the fuel assemblies when installed in position, prior to being discharged through one or more outlet nozzles 44 and into their corresponding primary loops, each of which conventionally includes a pump and steam generator, not shown. The above-described structure is well known in the art and is shown herein to help illustrate the invention.

Upon the occurrence of a loss of coolant accident resulting from a major break in inlet piping 41 connected to inlet nozzle 42, the pressurized coolant in the reactor is instantaneously and violently expelled through the 36 inches diameter inlet nozzle with such force that the reactor is evacuated in less than 30 seconds The transient action would immediately expose the fuel rods were emergency coolant not promptly injected into the core but there is nothing in the reactor to withhold or prevent the emergency coolant from also flowing out the pipe break.

Figure 3:
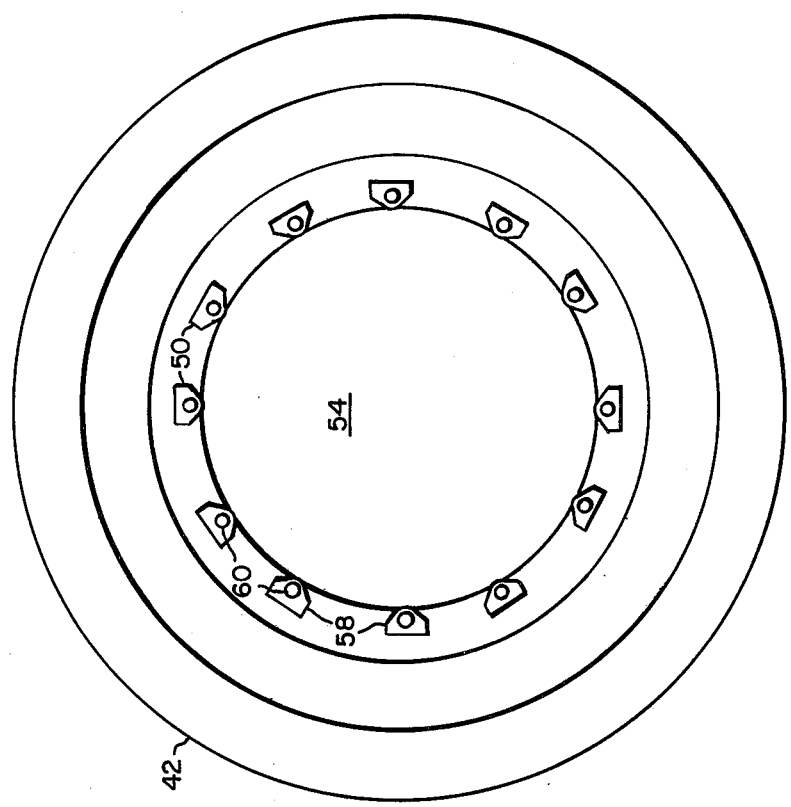
FIG. 3 is a side view of the inlet nozzle shown in FIG. 2.
Figure 2:
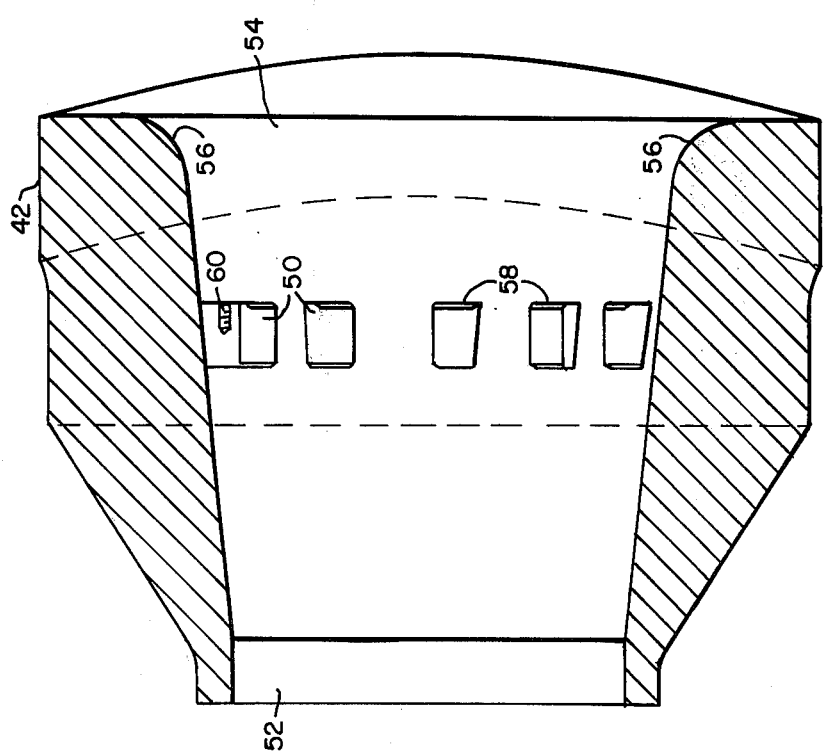
FIG. 2 is a view on elevation, partly in section, of an inlet nozzle to a nuclear reactor.

This invention accordingly provides an arrangement which precludes evacuation of the reactor, under loss of coolant conditions, and maintains upward flow velocity through the core, for a time sufficient for the fuel rods to achieve a safe, low temperature. In carrying out the invention, a system transient overflow protector (S.T.O.P.) comprising a multi-venturi device 46 is mounted in each cold leg inlet nozzle 42. The size of reactor shown to illustrate the invention contains four inlet nozzles 42 integrally formed with the pressure vessel 10 but obviously, the invention is equally applicable to one or more inlet nozzles. FIGS. 2 and 3 illustrate the design of a typical inlet nozzle and each nozzle has an inlet opening 52 which diverges to an outlet 54. To help facilitate flow into downcomer 22, the outlet ends diverge at a sharp angle to form a rounded surface 56.

The inlet nozzle 42 has been modified to show the disposition of Inconel bolting lugs or pads 50. These lugs are attached by full penetration welds to areas within the inlet nozzle which preferably have been coated previously with Inconel cladding. Alternatively, the lugs or pads can be integrally formed with the inlet nozzle walls during the pressure vessel manufacturing process. Each of the lugs or pads 50 shown are of identical size and construction and are located approximately midway of the nozzle length and project inwardly from the nozzle walls. The lug faces 58 are co-planar and each lug is provided with a threaded opening 60 for receiving the ends of bolts, not shown, used in mounting the multi-venturi protector in the nozzle inlet.

The most serious break or rupture in cold leg piping 41 which supplies coolant to the reactor is conventionally called a double ended cold leg guillotine break which is illustrated in FIG. 1. This type of rupture can be visualized as a saw cut completely through the inlet pipe in a plane perpendicular to the pipe axis, with the cut ends being completely displaced from each other. The pipe end extending from the pump will then freely discharge coolant into the space outside the reactor, i.e., reactor containment area. Since coolant in the reactor is still under high pressure, its flow direction will reverse and discharge through the other cut end of the pipe into the space outside the reactor. Although currently designed systems are capable of handling this serious type of adverse condition, it is recognized that a longer time of residence of coolant in the reactor should be available to help assure that the fuel rods comprising the reactor core will not become unduly heated or damaged as a result of the lack of coolant which otherwise carries away the generated heat.

The multi-venturi protector 46 arranged for mounting in the cold leg nozzle 42 is the result of continuous effort to discover higher performance, simpler more reliable and less costly emergency core cooling devices, and particularly, a protector which will effectively contain coolant inside a reactor for a time period sufficient to obtain the advantages of a type described hereafter. The primary function of the multi-venturi protector therefore is to provide significant impedance to outward flow of coolant through the inlet nozzle, i.e., flow in a reverse direction through the inlet nozzle, during a loss of coolant transient, with minimal effects on steady state performance during normal reactor operations.

Figure 5:
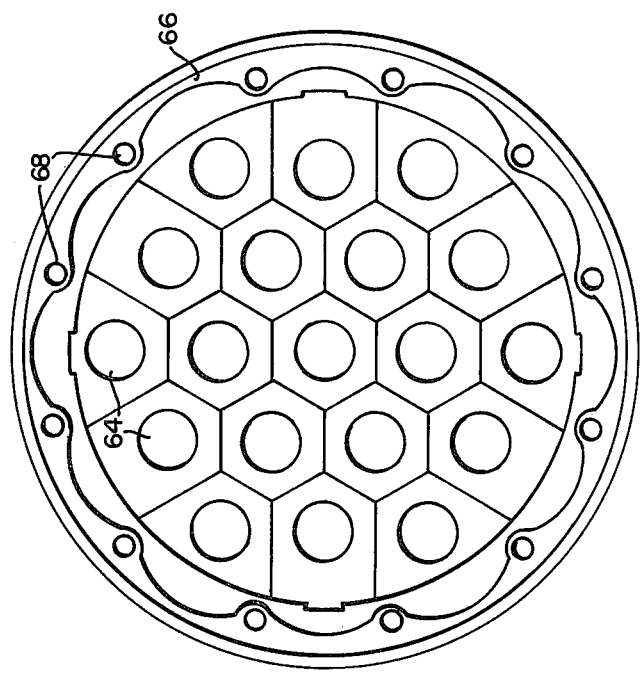
FIG. 5 is a view in elevation of th entrance end of the venturi protector illustrated in FIG. 4.
Figure 4:
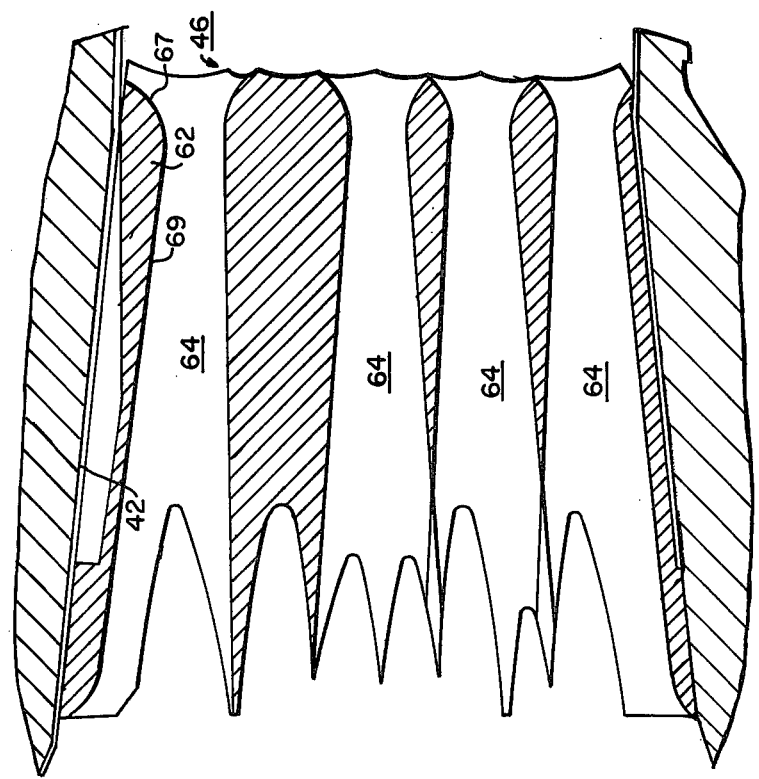
FIG. 4 illustrates a multiple venture protector wherein the top half of the FIGURE is a elevation view shown in cross section to the center line of the device and the bottom half of the view is a plan cross section to the center line of the device.
Figure 6:
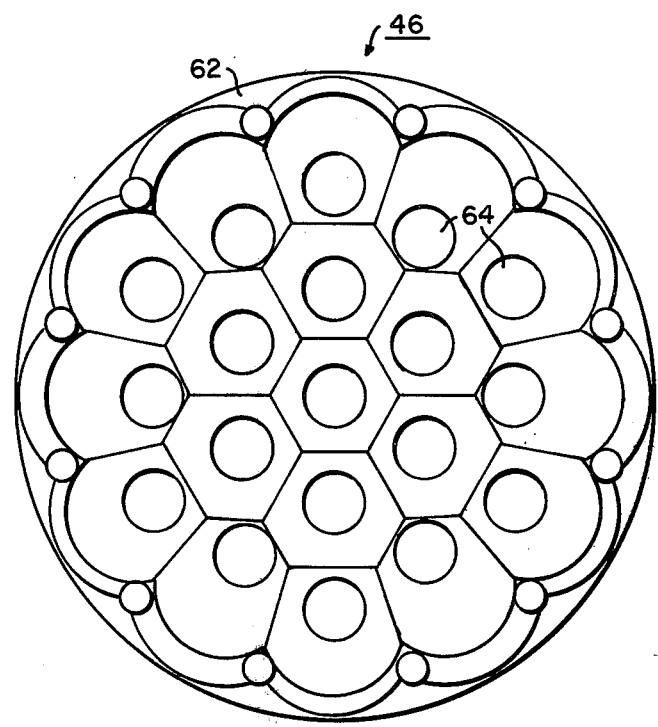
FIG. 6 is a view in elevation of the exit end of the venturi protector illustrated in FIG. 4.

FIGS. 4, 5 and 6 illustrate the design of such a multi-venturi protector which will effectively accomplish the above objective. A single venturi device having a 7° diffuser angle has been considered but to achieve the desired performance, a venturi length in excess of 15 feet would be required thus making it unacceptable for application to a nuclear reactor. However, the same high performance of the 15 foot venturi is obtained according to this invention by locating many high efficiency ventures 64 in parallel in a single device or protector 46 and burying the device in the inlet nozzle 42 of the reactor vessel, thereby protecting the reactor core against the influence of breaks in the inlet piping. The multi-venturi protector 46 shown has a total length of approximately 34 inches, rather than 15 feet, thus permitting it to be positioned well within the cold leg nozzle 42 and with the result that the internal structure in the reactor will experience no changes in flow forces. This length and the number of venturies obviously will vary for different size reactors.

Desirably, the protector 46 is made from a solid casting 62 of type 410 stainless steel and its outer surface is accurately machined to complement or match the inner surface of inlet nozzle 42 in which it is mounted. The body of casting 62 includes a flange 66 of heavy material and in the arrangement shown, a plurality of bolt holes 68 extend longitudinally of the protector for receiving bolts used in removably mounting the protector in the inlet nozzle. Each bolt measures 1 inch diameter and 12 inches in length and is screw threaded into the pads or lugs 60. By utilizing this kind of arrangement, the bolt design and location permits removal and in-service inspection of the vessel nozzle and the venturi protector. The bolts further are designed to allow for differential expansion between the pressure vessel and the venturi protector which occurs during system transients and will have the capability to retain the venturi protector in position when subjected to the full system pressure of 2250 psi. Further the honeycomb design of the venturi protector precludes the likelihood of stress problems arising in the structure.

The protector shown to illustrate the invention includes nineteen venturies 64 disposed in substantially parallel relationship with each other and the ratio of the total venturi throat area to the inlet flow area is 0.25. This venturi area ratio is optimized for a given reactor to provide the core flow and temperature performance required. Even though a high efficiency venturi is used, consideration has been given to the influence of this device during steady state operation. Each venturi is designed with a well rounded entrance geometry 67 and an 8° total diffuser cone angle 69 to minimize pressure losses during normal operation. The entrance end of the protector has a diameter of 27.468 inches while the diameter at the exit end is 33.41 inches.

Hydraulic performance tests show that for a .25 area ratio and an 8° total diffuser angle, a pressure loss of from 16 to 18 psi per loop in the reactor coolant system will result when the multi-venturi protector is installed in the inlet nozzle 42. Although the venturi throat area to the inlet flow area ratio has been selected at 0.25, it will be apparent that this ratio may vary depending on the performance desired from the protector, when mounted in a given design of inlet nozzle. A venturi protector which has a throat area in the range of 0.33 to 0.25 of the cold leg pipe area will produce maximum velocities at the throat of 150 to 200 feet per second. At these velocities, there are some concern that metal erosion or wire drawing at the throat could occur under noraml operating flow conditions. To determine whether such wire drawing or erosion would take place, a venturi model was subjected to non-cavitating flow at 200 feet per second at the venturi throat for 565 hours. The results show that no visible or measured metal erosion occurred. The machining marks on the venturi throat were found to be unaffected. Pre-test and post-test measurements consisted of weight measurements of the venturi throat insert, profilometer measurements of the venturi throat and measurements of the venturi throat diameter, and it was found there were no differences between the pre-test and the post-test measurements greater than the tolerance expected on the measuring equipment.

In the event of a double ended cold leg guillotine break in the coolant inlet piping to the reactor, the normal flow of coolant towards the inlet is diverted in a direction away from the inlet and therefore does not enter the reactor core. Also, since coolant in the reactor is under a pressure of more than 2,000 psi, such pressure causes coolant inside the reactor to flow in a reverse direction through the inlet nozzle and out of the break in the cold leg piping, thereby promptly evacuating the core.

Figure 7:
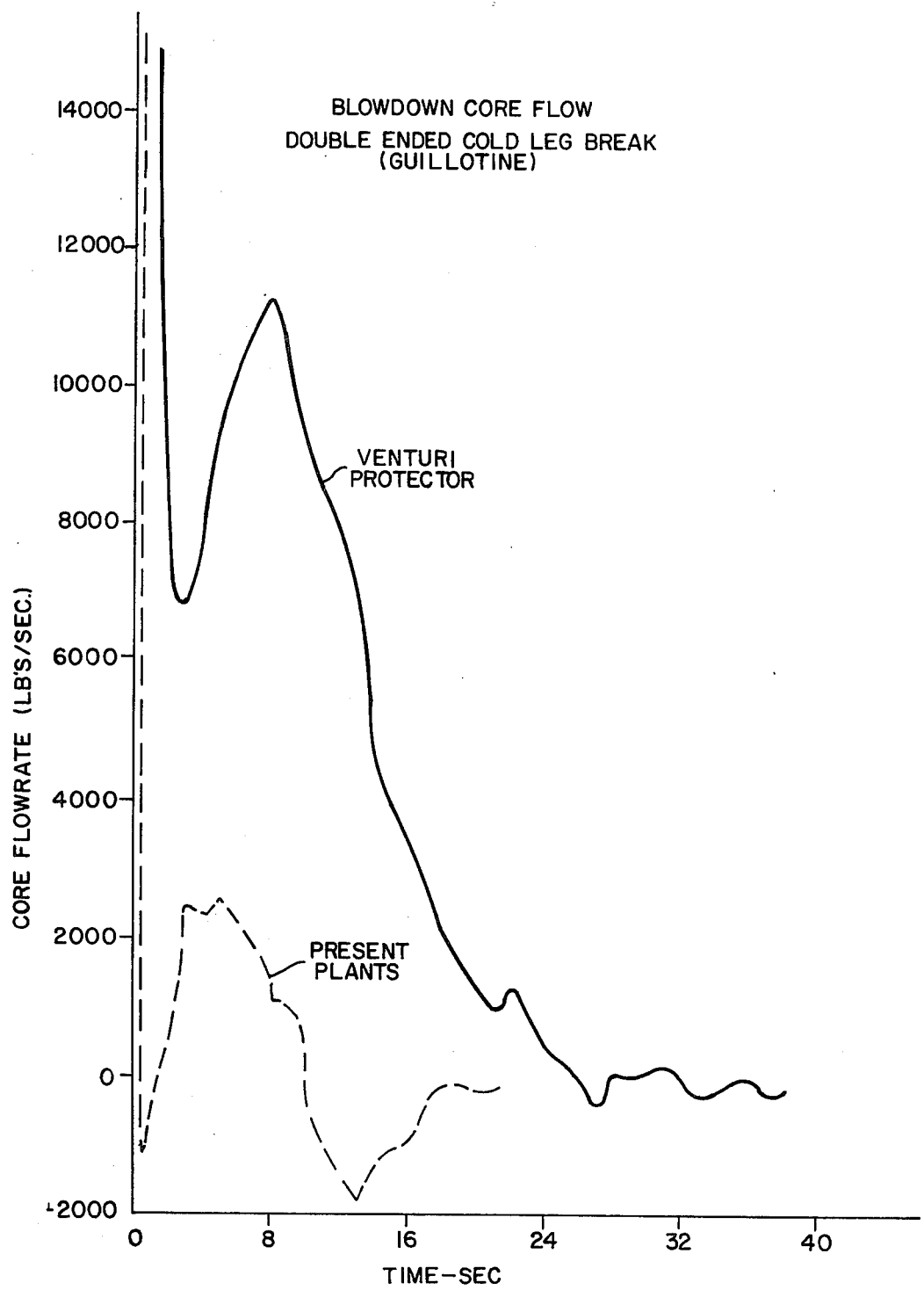
FIG. 7 shows curves illustrating blow-down core flow for a double ended cold leg guillotine break in inlet piping to the reactor.
Figure 8:
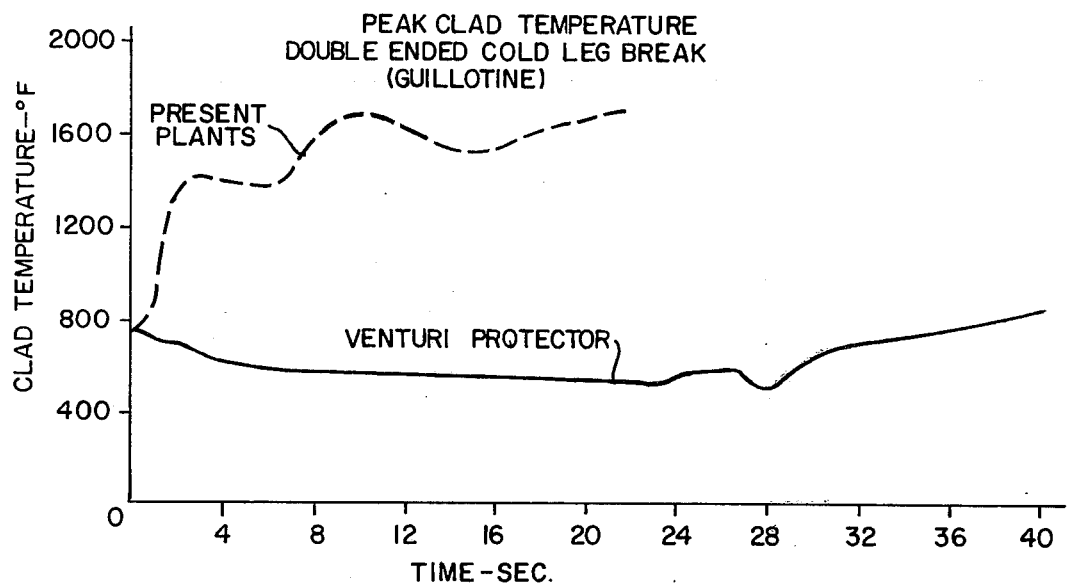
FIG. 8 shows curves illustrating temperature at the surface of fuel rods when the reactor is exposed to a double-ended cold leg guillotine break.
Figure 9:
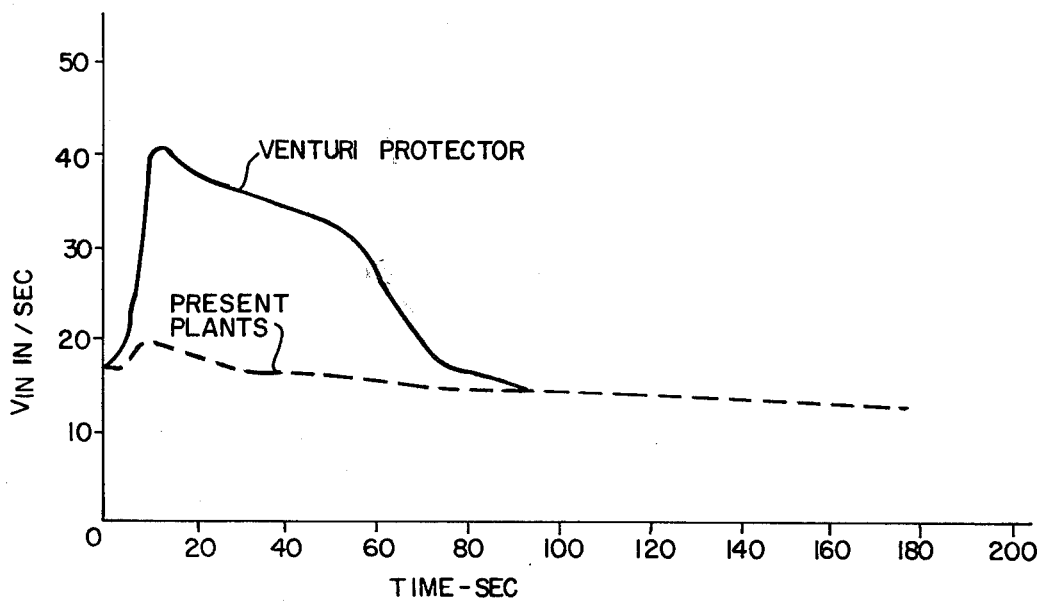
FIG. 9 shows reflood transient for a reactor during injection of emergency coolant under conditions of a double ended cold leg guillotine break.

FIGS. 7, 8 and 9 graphically illustrate the actions which take place in a reactor containing four primary loops. For presently designed plants which do not contain any kind of restrictor or protector in the inlet nozzle, promptly upon the occurrence of a guillotine break in the inlet piping, a transient blow-down condition arises with flow occurring in the reverse direction out of the inlet nozzle. As shown by the dotted lines in FIG. 7, the transient results in instantaneous and substantially complete displacement of coolant in the reactor, with a slight core flow reversal taking place near the end of the transient.

The solid line curve in FIG. 7 illustrates the transient condition which results when the multi-venturi protector of this invention having an area reduction to 0.25 of the cold leg pipe area, is mounted in the cold leg inlet nozzle 42. It is evident that the resistance to reverse flow provided by the multiple ventures has a significant influence on core flow behavior during blowdown, particularly for guillotine-type breaks which represents the most serious pipe break to be encountered. The impedance to flow offered by the venturi protector reduces flow from the downcomer between the pressure vessel and core barrel to the pipe break, and as a result, the early core reversal is eliminated. The curve clearly shows that the downcomer to break flow reduction results in an extended period of high positive core flow, as well as a longer blowdown, which as shown extends to 26 seconds.

The importance of this relatively long residence time of coolant in the reactor is that the fuel rod surfaces are maintained at a safe, low temperature thus providing protection to the fuel rods until control rods and emergency coolant can be injected into the core which helps place the reactor in a shut-down condition. As shown by the dotted line curve of FIG. 8, reactors which do not contain venturi protectors or other type restrictors in the inlet nozzle often experience fuel rod temperatures of 1700° F. This high temperature is significant since the normal zircoloy fuel rod is damaged at 1200° F.

Beyond 1200° F, fuel swelling and core blockage to flow occurs also at 1700°–1800° F. Also, significant energy is imparted to the water by reaction of the zircoloy cladding with oxygen in the water. The solid line curve of FIG. 8 shows that by utilizing the present invention, the fuel rod surface temperature, during the first four seconds after a pipe break, drops from 750° to 600° F then remains relatively constant over a substantially long time period. This temperature drop is directly attributable to the relatively long time retention of coolant in the core and which is achieved by the use of the multi-venturi protector 46 in the inlet nozzle 42.

In the usual design of reactor, accumulators inject emergency coolant into the upper portion of the reactor vessel as soon as sensors detect a pressure drop in the reactor coolant. Distributor means in the reactor then supplies such emergency coolant from the upper head area to the core located in the pressure vessel. In view of the desirable benefits which flow from the use of venturi protectors in the inlet nozzles, the reactor vessel can now be modified to the extent of supplying emergency coolant from the accumulators through inlets 70 located above and between the inlet and outlet nozzles 42 and 44. Accumulator injection therefore can take place directly into the downcomer rather than from the top of the reactor or through the inlet as is provided in some designs. The existance of a multi-venturi protector in the inlet nozzles will provide resistance to the flow of injected accumulator water reversely through the inlet nozzle under conditions of an inlet pipe break. This action will help assure the availability of coolant in the core for maintaining the fuel rods at a safe, low temperature.

Reflood transients were determined for the double ended cold leg guillotine break with and without flow restrictors. These transients included the area change pressure drop and the recoverable losses in the orifices. The curves of FIG. 9 show the reflood transients, and as indicated, a doubling of the core flooding rate takes place for the design where multi-venturi protectors are located in the inlet nozzles. The higher flooding rate results from downcomer pressurization caused by the pressure drop through the broken cold leg flow resistor.

As previously indicated, the 0.25 ratio of venturi throat area to the inlet flow area results in a pressure loss from 16 to 18 psi. per loop in a 4 loop reactor coolant system. This pressure loss corresponds to a pumping power change of approximately 1,000 horsepower per pump. Should the entire pressure drop associated with the multi-venturi protector be absorbed by increasing the pump horsepower and maintaining the original flow rates, an increase from 7000 hp to 8000 hp would be required for the 0.25 venturi ratio.

In view of the above, it is apparent that many modifications and variations are possible in light of the above teachings. It therefore is to be understood that within the scope of the appended claims, the invention may be practiced other than as specifically described.

What is claimed is:

1. A nuclear reactor comprising:
   a closed pressure vessel having at least one inlet nozzle an an outlet nozzle;
   a core in the pressure vessel including fuel rods which generate heat during operation of the reactor;
   inlet piping connecting to the inlet nozzle for supplying coolant therethrough which passes in heat exchange relationship with the fuel rods for absorbing heat therefrom prior to discharge out the outlet nozzle;
   a removable casting positioned completely in said inlet nozzle, said casting having multiple substantially parallel venturies therein extending longitudinally of the inlet nozzle, each of said venturies having a design which permits unimpeded flow of coolant into the reactor during steady state reactor operation, but inhibits flow therethrough in a reverse direction upon the occurrence of a major break in the inlet piping connected to the inlet nozzle;
   said venturies thereby being effective to cause said coolant to remain in contact with the fuel rods for a time sufficient to prevent said fuel rods from reaching an unacceptably high temperature.

* * * * *